(12) United States Patent
Shariati

(10) Patent No.: US 10,785,671 B2
(45) Date of Patent: Sep. 22, 2020

(54) SYSTEMS AND METHODS FOR PERFORMING DATA AGGREGATION IN WIDE AREA NETWORKS

(71) Applicant: Behrooz Shariati, San Francisco, CA (US)

(72) Inventor: Behrooz Shariati, San Francisco, CA (US)

(*) Notice: Subject to any disclaimer, the term of this patent is extended or adjusted under 35 U.S.C. 154(b) by 0 days.

(21) Appl. No.: 16/017,807

(22) Filed: Jun. 25, 2018

(65) Prior Publication Data

US 2019/0394667 A1 Dec. 26, 2019

(51) Int. Cl.
*H04W 28/02* (2009.01)
*H04W 76/15* (2018.01)
*H04W 28/08* (2009.01)
*H04W 12/02* (2009.01)
*H04W 92/10* (2009.01)
*H04W 88/04* (2009.01)
*H04W 88/06* (2009.01)
*H04W 88/18* (2009.01)

(52) U.S. Cl.
CPC ....... *H04W 28/0205* (2013.01); *H04W 12/02* (2013.01); *H04W 28/08* (2013.01); *H04W 76/15* (2018.02); *H04W 88/04* (2013.01); *H04W 88/06* (2013.01); *H04W 88/182* (2013.01); *H04W 92/10* (2013.01)

(58) Field of Classification Search
CPC . H04W 28/0205; H04W 12/02; H04W 28/08; H04W 76/15; H04W 88/182; H04W 88/06; H04W 92/10; H04W 88/04
See application file for complete search history.

(56) References Cited

U.S. PATENT DOCUMENTS

| | | | |
|---|---|---|---|
| 9,608,891 B2* | 3/2017 | Kollu | H04W 48/18 |
| 2017/0048790 A1* | 2/2017 | Pratapa | H04L 65/1016 |
| 2017/0048924 A1* | 2/2017 | Mate | H04W 84/12 |
| 2017/0237506 A1* | 8/2017 | Soto | H04B 10/00 398/116 |

* cited by examiner

*Primary Examiner* — Ian N Moore
*Assistant Examiner* — Rushil Parimal Sampat
(74) *Attorney, Agent, or Firm* — Sheppard, Mullin, Richter & Hampton LLP

(57) ABSTRACT

A hotspot comprises WAN interfaces, each WAN interface coupleable with a wireless WAN, at least two wireless WANs including at least two cellular WANs, at least two WAN interfaces including two ports configured to receive two SIMs, each SIM for connecting over a cellular WAN, each WAN interface disposed in or couple to a housing; a LAN interface coupleable with a network-enabled device over a LAN, the LAN interface disposed or coupled to the housing; and an aggregator configured to use a distribution protocol to identify two or more WAN interfaces in response to a data connection request; receive outgoing data from the device; partition the outgoing data for transfer over the two or more WAN interfaces; transfer the partitioned outgoing data to the two or more WAN interfaces; receive incoming data from the two or more WAN interfaces; and transfer the directed incoming data to the device.

19 Claims, 12 Drawing Sheets

SYSTEMS AND METHODS FOR PERFORMING DATA AGGREGATION IN WIDE AREA NETWORKS

TECHNICAL FIELD

This description relates to apparatus and methods for improving wireless network connections, more specifically to aggregating multiple heterogeneous wireless WAN connections into a single LAN connection to provide higher throughput, connection speed, data limit, and more security and privacy.

BACKGROUND ART

In recent years, fast and reliable access to the Internet has become a necessity in most facets of daily life, including travel. Modern travelers, among others, need a stable and fast Internet connection while away from home. A fast and stable connection is important because, in addition to providing communication and entertainment, the Internet has become the primary source of travel information, planning, making and changing reservations, navigation, translation, and payment. The days of walking around an unfamiliar city with a guidebook, making reservations by calling airlines, hotels, restaurants, or attractions, and using a paper map to navigate around an unfamiliar city are coming to an end. More recently, on-line natural language translation tools allow far better communication options than the old phrase book solution, and the advent of ride-hailing applications have largely supplanted traditional taxi services, all of which require a fast and stable data connection. Further, travelers are not the only Internet users who could benefit from a fast, stable, and secure mobile connections. Busses, trains, and other local and long distance transport systems can benefit, as can stationary locations that do not have access to wired broadband but have cellular phone coverage, particularly in areas outside major metropolitan areas, such as rural or farm areas.

Another recent concern for wireless data users is security and privacy. Data transmitted over the air is susceptible to interception, spoofing, and compromise. One of the methods used to intercept wireless data transmission is by a "man in the middle" attack where a hostile or corrupted wireless access point or micro cell masquerades as a legitimate connection point and monitors or intercepts data sent to, or received by, the users that connect to it. This type of attack relies on having all of the victim's data traffic traverse the compromised connection point in order to reconstruct the communication between the victim and Internet services such as banks in order to harvest useful information, such as Login IDs, PINs, or passwords from the intercepted data.

Typically, hotels, restaurants, coffee shops, offices, and other establishments provide Wi-Fi (IEEE 802.11) service to employees and visitors using a wired broadband connection (DSL, Cable, Fiber, etc.) as the backend connection. This type of Wi-Fi service is only accessible at or around the establishment and the user must connect to, and when needed, log into each fixed WiFi hotspot in order to use it. When Wi-Fi service is required away from fixed locations or on a vehicle, portable Internet service may be available using mobile telephones or portable hotspots using wireless mobile service protocols, such as GSM, as the backend connection. On-board rechargeable batteries typically power these mobile phones and portable hotspots, although they could also be powered by a vehicle or plugged into a power grid. FIG. 1 shows an example of such an existing portable hotspot. As shown in FIG. 1, portable hotspot 200 establishes a Mobile Connection with cellular tower 100 that provides a Network Connection to the Internet. As shown schematically in FIG. 2, the mobile telephone or portable hotspot include a Mobile Wide Area Network (WAN) interface 210 that sets up communication link 101 with the mobile network through cellular tower 100 using Mobile WAN Interface 210. The hotspot also creates a Wi-Fi wireless network 230 using the Wi-Fi Local Area Network (LAN) interface 220. WAN Interface 210 connects to Wi-Fi LAN Interface 220 through data interface 201. Devices requiring Wi-Fi service can connect to Wi-Fi LAN Interface 220 on Wi-Fi network 230. Alternatively, a mobile telephone with hotspot or tethering capability could perform the same function, using similar interfaces, as the portable hotspot illustrated in FIGS. 1 and 2. All references in this disclosure to a hotspot include mobile telephones, or other communications devices, with hotspot or tethering capability when connected to a compatible Wireless WAN.

Using a mobile telephone or hotspot as a portable hotspot requires a valid local mobile telephone account that includes a data or Internet option. The account may be provided through a post-paid (subscription) contract or by purchasing pre-paid service that provides a fixed amount of data available, maximum data transfer speed, account duration, or other limits. A pre-paid service is typically enabled by purchasing a Subscriber Information Module (SIM) and installing and activating it in a compatible mobile telephone or other mobile device. In some cases, non-removable circuitry built into the mobile device is used to enable the functionality of the mobile device instead of a removable SIM. Pre-paid accounts are generally available with a mix of voice, data and SMS service, including Data-Only accounts, enabled by SIM or other circuitry, that only provide data service.

Data-Only Accounts are available for purchase in the US and many countries around the world, and the stability and speed of the connection provided by a local Data-Only Accounts is limited by the capabilities of the local wireless network. While these limitations apply to all wireless networks, their impact more noticeably affects the users in locations where the mobile networks are not as extensively developed or that deploy older or slower standards.

In addition to the inherent limits of the wireless network, the carriers often impose additional restrictions on each account for financial or technical reasons, for example to charge more money for accounts with higher speed or data limits than the more restrictive ones. These limits imposed by the carriers are simply parameters set by the carrier for an account, and it is sometimes possible to reduce or eliminate these limits by making additional payments to the carrier for an upgraded account, however this option is not always available, or it can be very expensive when it is.

Finally, because the existing Data-Only accounts only allow a single point of connection to the local wireless WAN, they increase the vulnerability of the user to a "man in the middle" type attack by making it possible for an attacker to intercept, monitor, and store all of the data sent by, and to, the user by compromising the single WAN connection used by the hotspot.

Accordingly, there is a need in the art to improve the speed, throughput, and capacity of wireless Internet service using available wireless telephone service. Another need in the art is to compensate for wireless carrier-imposed limitations on individual accounts. Finally, there is a need to enhance security and privacy of wireless data connections.

SUMMARY

The present disclosure introduces various illustrative embodiments for a Multi WAN connection hotspot for improved Internet connections. In some embodiments, the disclosed subject matter relates to improving mobile wireless technology by combining multiple wireless WAN data connections and connecting it to a single LAN. Existing technology enables users to make a single WAN connection to a wireless network. While this technology provides mobility, it suffers from a number of limitations, including the maximum data speed and transfer limits inherent in the deployed wireless network for a single connection, as well as those imposed by the carriers that applies to each account. A single network connection also makes the user more vulnerable to loss of private data by channeling all of the user's network traffic through a single connection that can be intercepted through a single compromised network connection.

Each individual account offered by a wireless carrier typically has its own speed and data transfer limits and is usually priced accordingly. Accounts with lower speed or maximum data limits are often significantly cheaper than those with higher capacity. In some cases, it may be cheaper to pay for multiple low-limit accounts than a single high-limit account, however, since current technology limits the WAN connection to a single mobile account, using a single SIM or equivalent, the higher speed option may not be available at all, and even when it is, the only option for higher speed Internet data service is to pay for a higher-priced, lower-limits wireless account.

The existing limit can be overcome by making multiple independent WAN connections, each consisting of a single Mobile Connection (e.g., GSM), Wi-Fi, or any other technology that provides a WAN connection to the Internet, and then combining the multiple connections to appear as a single WAN connection to the local LAN. In the case of a Mobile Connection, each wireless account has its own independent limits, both inherent in the available technology along with any limits imposed by the wireless carrier. By combining multiple wireless WAN connections each with its own individual limits, the resulting single LAN connection can exceed the limitations of any single WAN connection and provide higher performance by dividing the data connection requests from the LAN among the available WAN connections using a variety of algorithms and by routing data received from each individual WAN connection to the single LAN. Because this approach does not depend on multiple homogenous data connections, it can compensate for loss or degradation of any wireless WAN connection by routing data through the other WAN connections while waiting for the lost or degraded connection to resume, or for a new WAN connection to be established. This approach also does not require that the individual WAN connections have the same account limits or even for all the WAN connections to be serviced through the same wireless carrier. It can optimize the overall data throughput by dividing the traffic through multiple heterogeneous WAN connections according to the user's preferences.

Using multiple WAN connections also improves privacy and security by transmitting the data through multiple, and potentially changing, paths via multiple data connections and even via different wireless carriers. If one WAN connection (e.g., a transceiver on a single tower or a WiFi WAN connection) is compromised, the data sent through other WAN connections cannot be intercepted through that exploit. And even if all of the data is sent through a single compromised WAN connection (such as single transceiver on a single tower), because it can be sent through multiple wireless carrier accounts, it would be more difficult to reconstruct the full data transfer and to associate it with a single user in order to intercept the full content of the communication.

It is understood that other configurations of the subject technology will become readily apparent to those skilled in the art from the following detailed description, wherein various configurations of the subject technology are shown and described by way of illustration. As will be realized, the subject technology of other different configurations and its several details are capable of modifications in various other respects, all without departing from the subject technology. Accordingly, the drawings and the detailed description are to be regarded as illustrative in nature and not restrictive.

BRIEF DESCRIPTION OF DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and the benefit of this disclosure.

DESCRIPTION OF EMBODIMENTS

Figure 1:
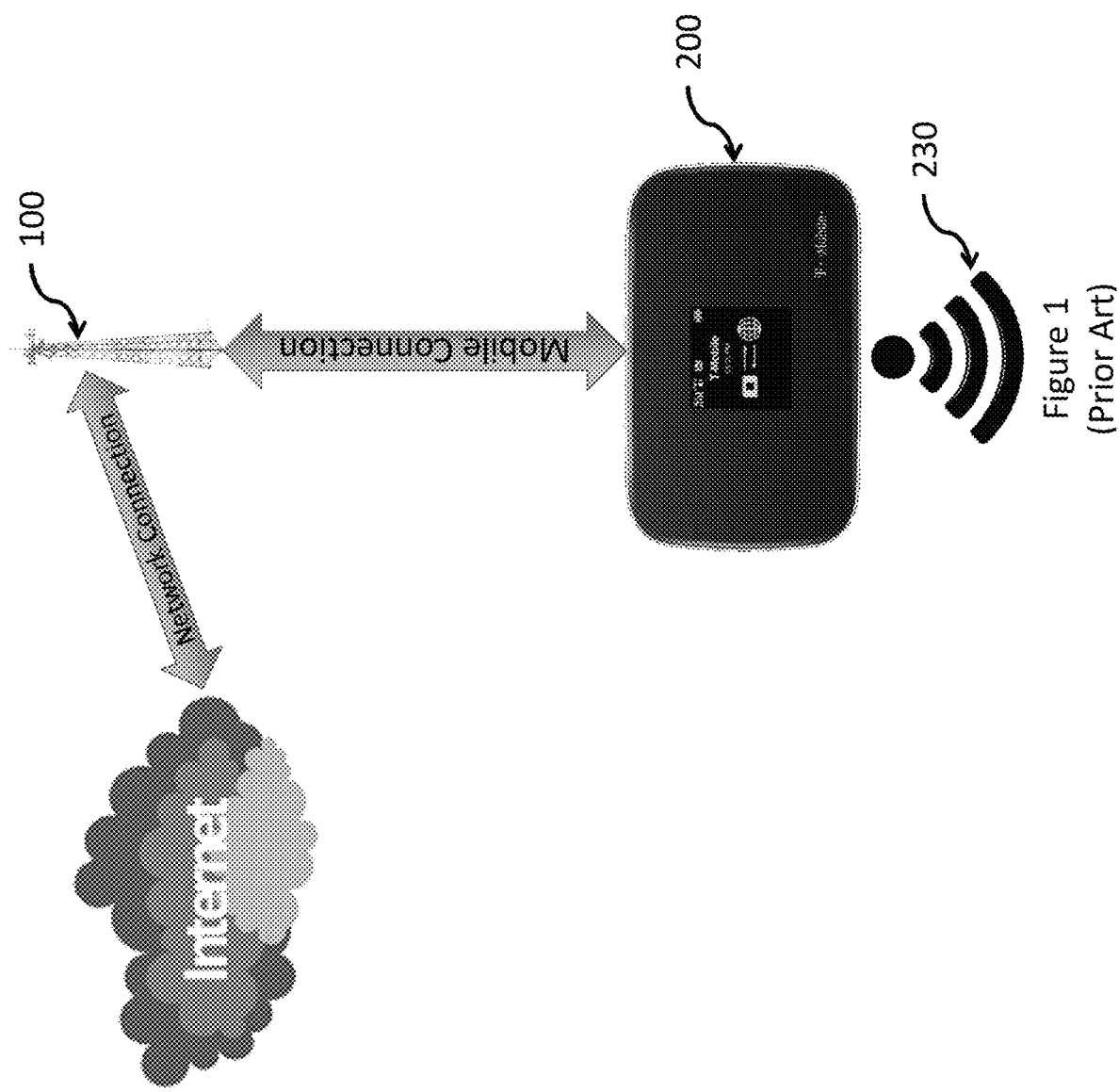
FIG. 1 illustrates schematically a prior art single-WAN portable Wi-Fi hotspot.

The present disclosure relates to a Multi-WAN Internet hotspot that combines multiple wireless WAN connections into a single LAN connection.

In the drawings, like reference numbers are used to designate like elements throughout the various views and embodiments of a unit. The drawings have been simplified in places for illustrative purposes only. One of ordinary skill in the art will appreciate the different applications and variations are possible based on the following examples of possible embodiments. The present disclosures refers to some of the embodiments described throughout this document and does not mean that all claimed embodiments must include the referenced aspects.

FIG. 1 illustrates a prior art portable hotspot 200. The prior art portable wireless hotspot establishes a Mobile Connection with a transceiver on cellular tower 100 that provides a Network Connection to the Internet, and simultaneously provides a local Wi-Fi connection 230 for Wi-Fi enabled devices.

Figure 2:
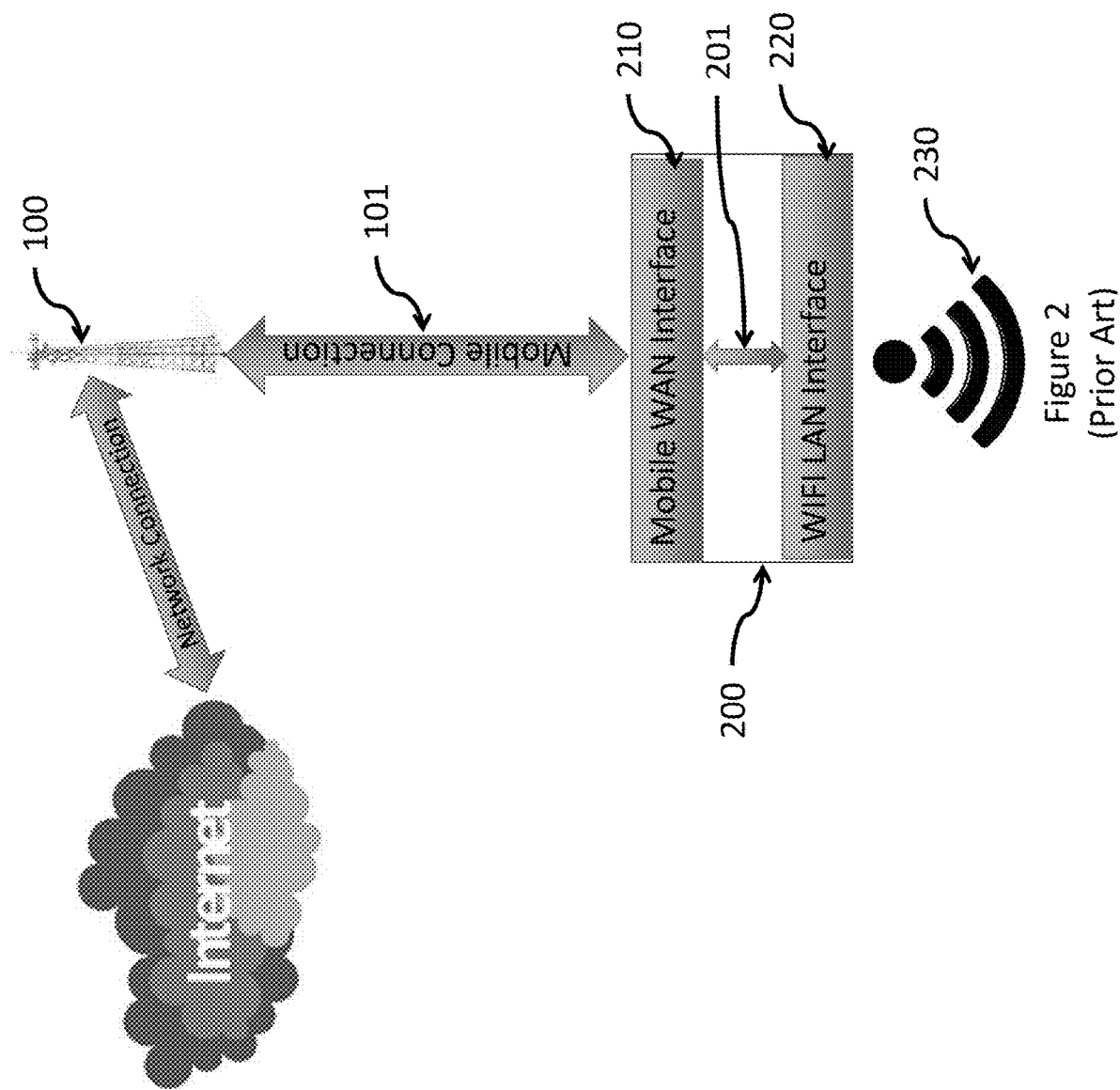
FIG. 2 illustrates schematically the data handling components of the prior art single-WAN portable Wi-Fi hotspot.

FIG. 2 illustrates schematically some of the components of the prior art portable wireless hotspot of FIG. 1. The mobile telephone or portable hotspot includes a Mobile Wide Area Network (WAN) interface 210 that sets up communication link 101 with the mobile network through a transceiver on cellular tower 100 using Mobile WAN Interface 210. The hotspot also creates a local wireless network 230 using the Wi-Fi (or other technology such as IEEE 802.15 Bluetooth) Local Area Network (LAN) interface 220. WAN Interface 210 connects to LAN Interface 220 through data interface 201. Devices requiring Internet service can connect to Wi-Fi LAN Interface 220 on Wi-Fi network 230. Alternatively, as previously disclosed, a mobile telephone with hotspot or tethering capability could perform the same function, using similar interfaces, as the portable hotspot illustrated in FIGS. 1 and 2.

Figure 3:
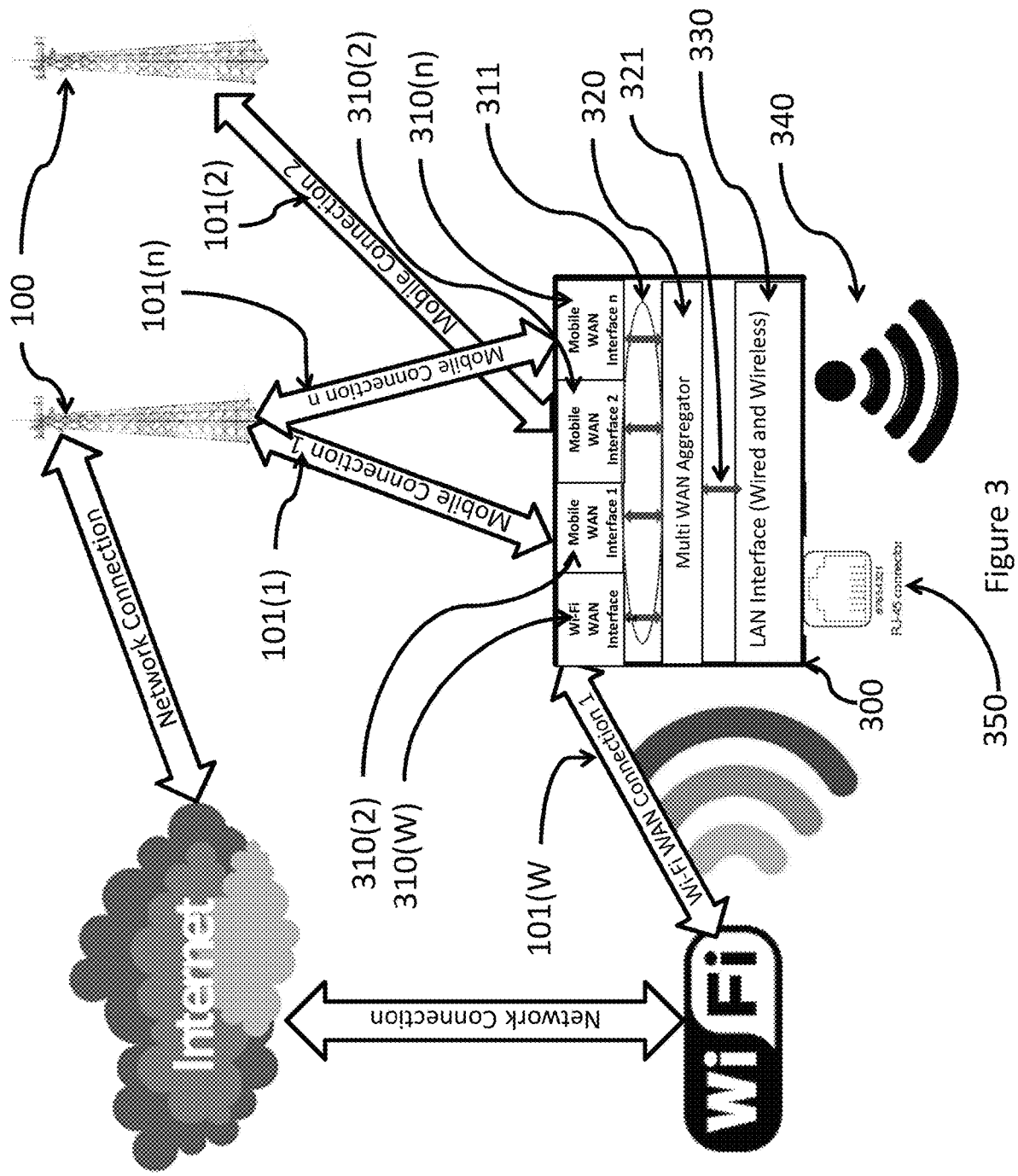
FIG. 3 illustrates schematically the data connections of an embodiment of a multi-WAN accelerated hotspot.

FIG. 3 illustrates schematically some of the components and data connections of a multi-WAN hotspot 300, in accordance with some embodiments of the present invention. The multi-WAN hotspot may be constructed as a standalone device or incorporated into another device (for example, a mobile telephone). It may be powered by onboard batteries or connected to an external power source, or both. It may be constructed as a portable or non-portable device that is fixed to a vehicle or stationary location. As illustrated, the multi-WAN hotspot 300 comprises a plurality of WAN interfaces 310, including one Wi-Fi interface 310 (W) and n Mobile WAN interfaces 310(1) through 310(n). The Wi-Fi WAN Interface 310(W) can connect to a Wi-Fi hotspot through a Wi-Fi WAN connection 101(W), and ultimately to the Internet. Each Mobile WAN Interface can connect to a mobile telephone network using a mobile telephone protocol such as GSM, LTE, or other protocol that allows providing a data connection through a mobile (also known as "cellular") network. Each Mobile WAN connection 310(1)-310(n) connects to a mobile transceiver 100 through a mobile data connection 101 using its own credentials. Not every Mobile Interface 310 need be connected every time the multi-WAN Hotspot 300 is used, and each individual connection can be disconnected and reconnected to accommodate the available network conditions and limitations. As illustrated in FIG. 3, WAN interfaces 1-n, may not all connect to mobile transceivers on the same tower during operation. This could be caused by operational conditions such as congestion, or because the WAN interfaces are credentialed for different network carriers, not all of which have mobile transceivers located on the same tower. Each specific WAN interface is controlled by user settings and network availability. For example, if a Wi-Fi network is not available to be used as a WAN, WAN Interface 310(W) is not used. Likewise, if the Multi WAN Hotspot 300 includes four Mobile WAN Interfaces 310(1) through 310(4) and the user only enables three valid mobile data accounts, only the three Mobile WAN Interfaces enabled by the user are used when the network allows them to connect and operate.

As illustrated in FIG. 3, each of the n Mobile WANs makes its own individual connection, which may or may not connect to a different tower, using a different mobile network, and different mobile account. Each WAN interface connects to a Multi WAN aggregator 321 using its own data connection 311. The Multi WAN aggregator 321 connects to a LAN interface 330 through a single data connection 321. The LAN interface 330 provides network connection to client devices such as computers, tablets, mobile phones, or Internet of Things (IOT) devices such as sensors or controllers (not shown) through a wired network connection 350 (for example, an IEEE 802.3 Ethernet) or a wireless network connection 340 (for example through an IEEE 802.11 Wi-Fi, or IEEE 802.15 Bluetooth, or other networking protocols).

Figure 4:
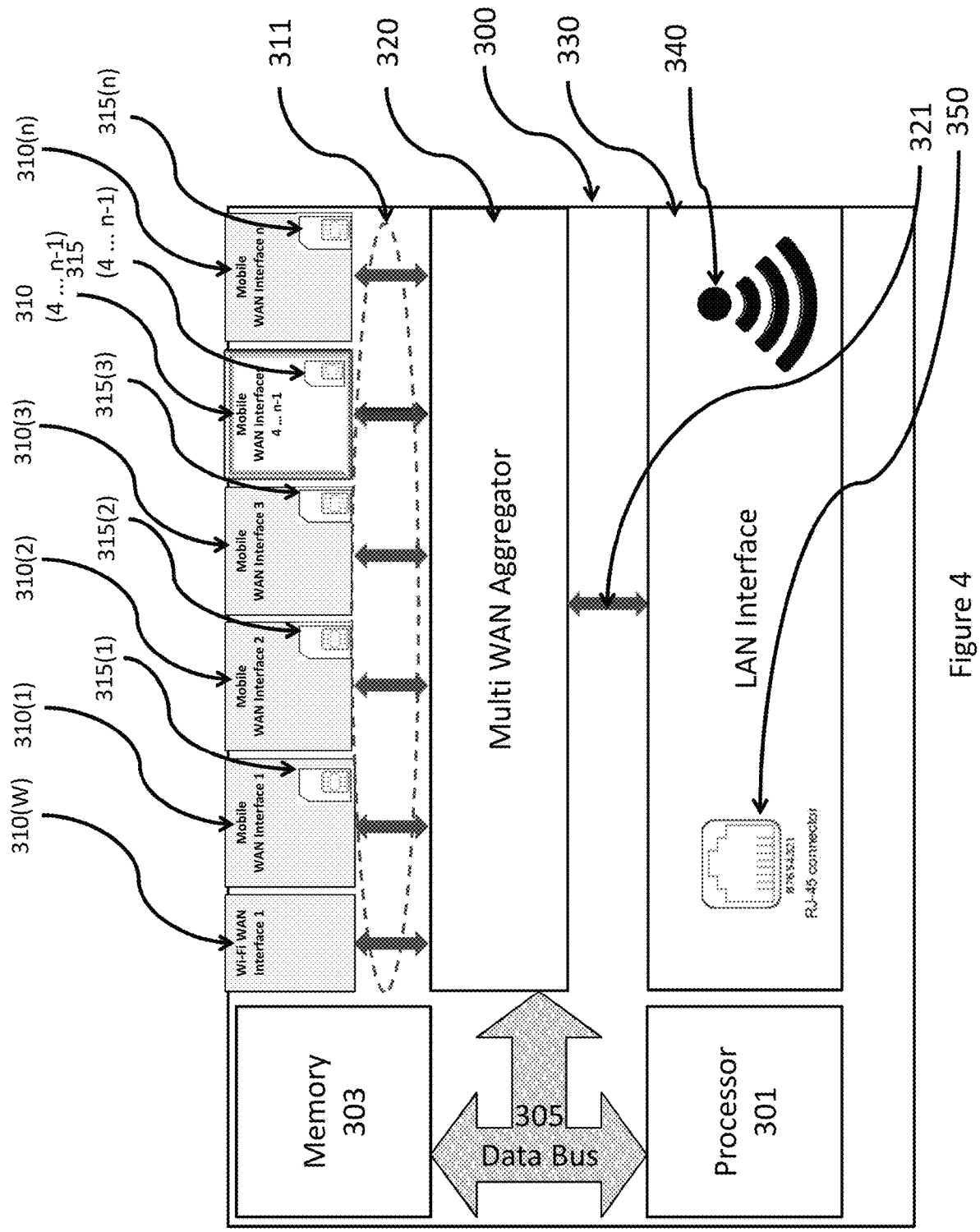
FIG. 4 illustrates schematically some of the data handling components and data connections of an embodiment of a multi-WAN accelerated hotspot.

FIG. 4 further illustrates schematically some of the components of the Multi-WAN hotspot 300 of FIG. 3, in accordance with some embodiments of the present invention. As further illustrated, each Mobile WAN Interface 310(1) through 310(n) incorporates an authentication component such as a Subscriber Information Module (SIM) or other similar component that uniquely identifies an authorized device, or authenticates a connection, to a Mobile Telephone Network. Using the SIMs 315(1) through 315(n), each Mobile WAN connection 310(1)-310(n) connects to a mobile transceiver on tower 100 through a mobile data connection 101, each using its own credentials. As illustrated in FIG. 3, each of the n Mobile WANs makes its own individual connection and may or may not connect to a different mobile transceiver, using a different mobile network, different mobile account, and mobile service provider. Each WAN interface connects to a Multi WAN aggregator 320 using its own data connection 311. The Multi WAN aggregator 320 connects to a LAN interface 330 through a single data connection 321. The LAN interface 330 provides network connection to client devices such as computers, tablets, mobile phones, or IOT devices (not shown) through a wired network connection 350 (for example, an IEEE 802.3 Ethernet) or a wireless network connection 340 (for example through an IEEE 802.11 Wi-Fi or an IEEE 802.15 Bluetooth network). The LAN interface 330 supports one or more clients to connect using a network protocol. The Multi-WAN hotspot further incorporates at least one processor 301 and memory 303 connected to each other and to the Multi WAN Aggregator 320 and other components through at least one data bus 305. Program code controlling the operation of the Multi-WAN hotspot 300 is stored in memory 303, executed by at least one processor 301, and communicates with Multi-Wan aggregator 320 and other components as needed through Data Bus 305.

Figure 5:
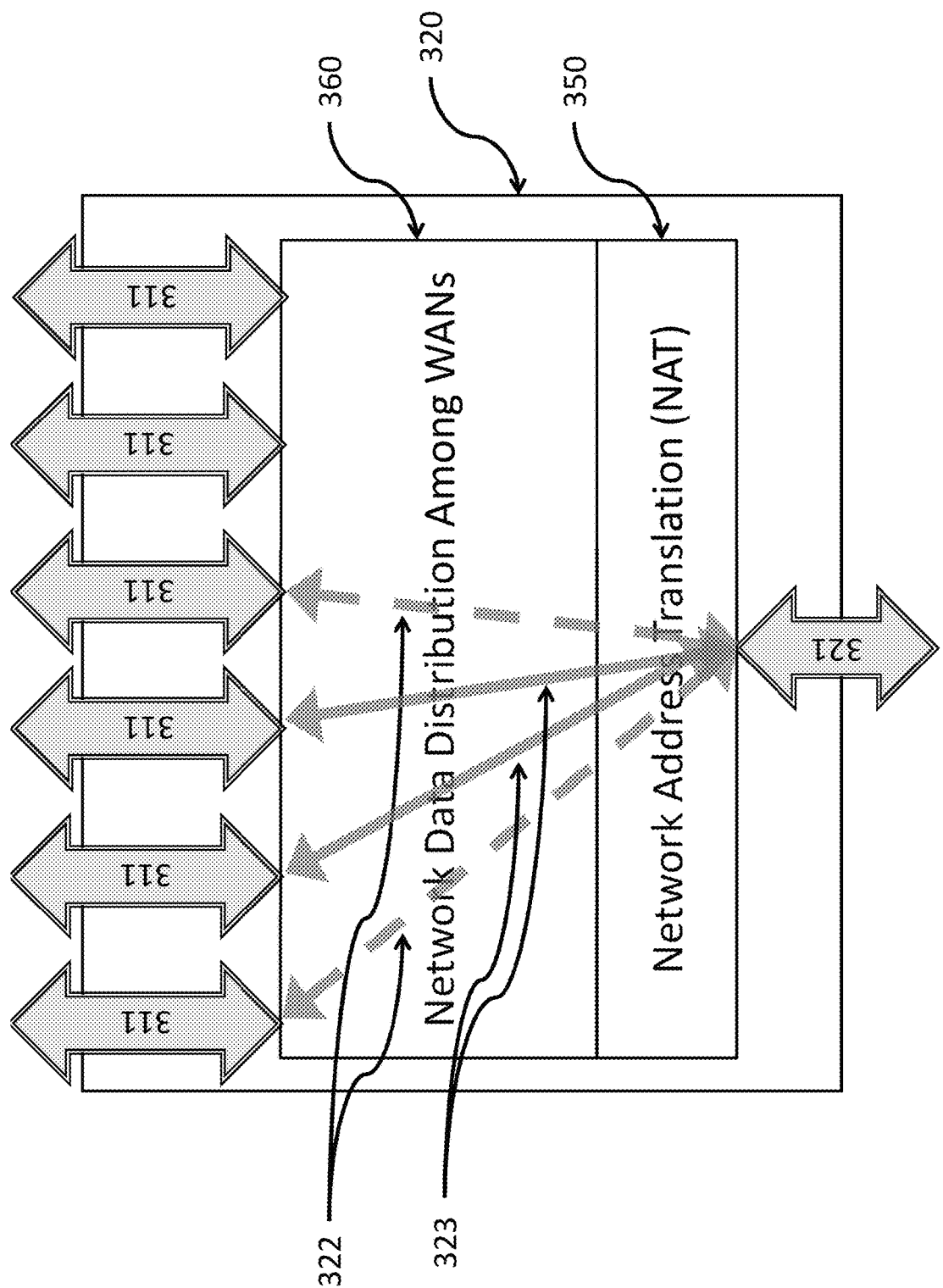
FIG. 5 Illustrates schematically some of the data handling components and data connections of a WAN aggregator 320, in accordance with an embodiment of the present invention.

FIG. 5 further illustrates schematically some of the internal components and data connections of the WAN aggregator 320. WAN aggregator 320 may be implemented in hardware, software, or a combination of both. In operation, the WAN aggregator 320 receives network data from LAN interface 330 through LAN connection 321, using network data distributor 360 to distribute the network data among available and connected WAN interfaces via network connection(s) 311. The network data may be distributed at different network layers. For example, referring to the OSI Model, the WAN aggregator may distribute layer 7 Application layer data among available WANs to assign each connection (for example, FTP, SMTP, DNS, etc.) to one of the available WANs. Alternatively, the WAN aggregator can operate at OSI level 3 and distribute individual network packets among available WANs. In another alternative, the WAN aggregator can distribute each TCP three-way handshake (SYN, SYN-ACK, ACK) to one of the available WANs and use that WAN for that session. Other network standards would provide different layers or methodologies that could be employed by WAN aggregator 320. Other possibilities include assigning each individual URL or other resource request to a specific WAN. These connections are illustrated as solid lines 323 in FIG. 5.

The Multi WAN aggregator 320 further provides Network Address Translation (NAT) 350, if needed, to adjust the source and/or destination address of each packet, for example the IP address, to translate internal LAN addresses to addresses compatible with the WANs. NAT is performed in both directions, as packets are sent from the LAN to each of the WANs, and when packets are received from any of the WANs to be sent to the LAN.

As further illustrated in FIG. 5, the WAN aggregator 320 may also provide persistent connection(s) to specific network connection(s) 311, as illustrated by dashed lines 322 in FIG. 5. Each persistent connection 322 could be used for applications such as cloud-based storage or other applications where it may be desirable to send and receive packets through the same connection. The example illustrated in FIG. 5 is a persistent connection to a service provided through Amazon Web Services, although this feature is not limited to any specific service or application and may be used to optimize any connection that the user prefers. The Multi WAN aggregator can support any combination of persistent connection(s) 322 and/or non-persistent connection(s) 323 as required, specified by the user, or by the operational conditions.

Figure 6:
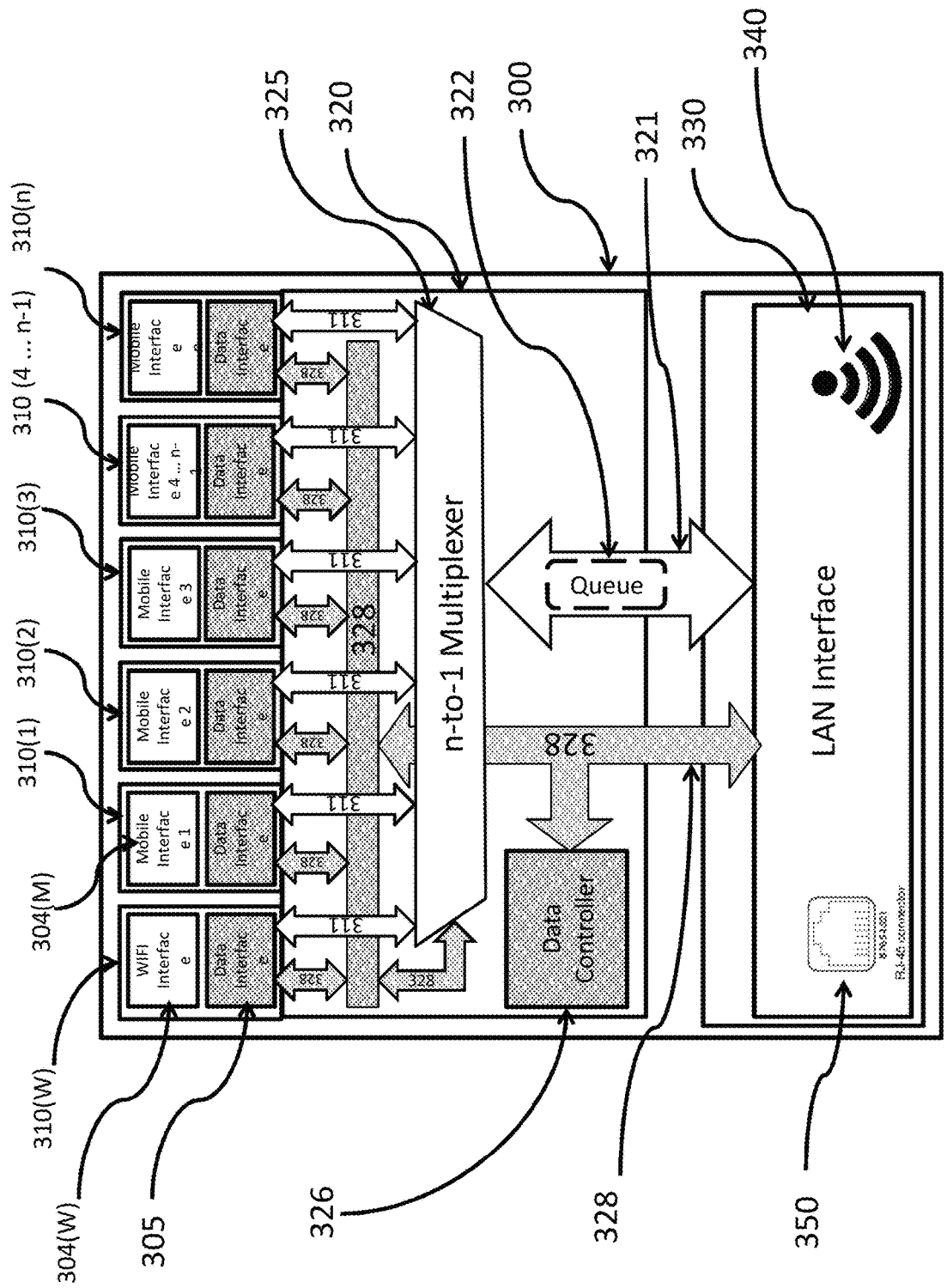
FIG. 6 illustrates schematically some of the data handling components and data connections, including a multiplexer used as a WAN aggregation component, of an embodiment of a multi-WAN accelerated hotspot.

FIG. 6 further illustrates schematically some of the additional components of the Multi-WAN hotspot of FIGS. 3 and 4, in accordance with some embodiments of the present invention. As illustrated, each WAN Interface 310(1) to 310(n) comprises a network interface 304 and a data interface 305. The Wi-Fi network Interface 304(W) connects to a Wi-Fi WAN, and each Mobile Interface 304(M) connects to a mobile data network, such as a mobile telephone network. In order to simplify FIG. 5, only the Wi-Fi interface 304(W) and Data Interface 305 of Mobile WAN Interface 310(W) and Mobile Interface 1 304(M) of WAN Interface 310(1) are labeled, one of ordinary skill in the art would understand that the similarly named components in Mobile WAN Interfaces 310(1) through 310(n) include the same or similar components of 310(W) and 310(1) through 310(n).

FIG. 6 further illustrates schematically that the multi-WAN aggregator 320 of FIGS. 3 and 4 may comprise an n-to-1 Multiplexer 325 where the Mobile WAN Interfaces 310(W) and 310(1) through 310(n) connect to the inputs of the n-to-1 Multiplexer 325 via data connections 311. Each Data Interface 305 may also include a data queue (not shown) to store data to be sent to or received from the respective WAN. The output of the n-to-1 Multiplexer 325 is connected via LAN data interface 321 to LAN Interface 330. The LAN data interface 321 may also include a data queue 322 to store data sent to or received from LAN Interface 330. The n-to-1 Multiplexer is controlled by data controller 326 that is connected to Control Bus 328, which is further connected to LAN Interface 330, n-to-1 Multiplexer 325, and the WAN Interfaces 310(W) and 310(1) through 310(n). Data Controller 326 is also connected via Data Bus 305 to at least one Processor 301 and Memory 303 shown in FIG. 4.

The LAN interface 330 provides network connection to client devices such as computers, tablets, mobile phones, or IOT devices (not shown) through a wired network connection 350 (for example, an IEEE 802.3 Ethernet) or a wireless network connection 340 (for example, through an IEEE 802.11 Wi-Fi or IEEE 802.15 Bluetooth).

During operation, each WAN Interface 310(W) and 310(1) through (n) that is enabled actively connects to a Wi-Fi or mobile network, as permitted by the available networks and the user's credentials. The client devices connect to the LAN Interface 330. Each time a connection request arrives at LAN Interface 330, it is first stored in data queue 322 (if the queue is implemented) and the Data Controller 326 selects a WAN Interface 310 to receive the next request. The selection may be made using a variety of algorithms, including round-robin, randomized, or based on parameters such as the maximum or measured bandwidth, capacity, or throughput of each WAN Interface 310. One of skill in the art can readily discern that a wide variety of algorithms, factors, parameters, or user settings could be implemented as part of the selection process implemented by Data Controller 326.

When a WAN Interface 310 is selected by Data Controller 326, the input corresponding to the selected WAN Interface 310 is activated through Data Bus 328. If a data queue 322 is implemented, the next connection request or other data in the data queue 322 is sent via the n-to-1 Multiplexer 325 to the Data Interface 305 of the selected WAN Interface 310. The selected Wi-Fi or Mobile Interface 304 of the selected WAN Interface 310 then transmits the connection request to its respective WAN. The Data Controller 326 again selects a WAN Interface 310 according to the selection algorithm (which may or may not be the same WAN Interface as the one selected for the previous request), and transmits the next data connection request from the queue 322 to the selected WAN Interface 310.

When Data is received through WAN Interface 310 in response to a connection request or other data transmitted earlier, if a data queue is implemented in Data Interface 305, the data received is stored in the data queue of the WAN Interface 310 that transmitted the data connection request. When the data queue is implemented in the respective Data Interface 305, the Data Controller 326 selects that Data Interface 305 as the active input of the n-to-1 Multiplexer 325, and the data received from the respective WAN is transmitted via Data Connection 321 to LAN Interface 330 and to the connected client devices through wired connection 350 or wireless connection 340, or both.

If no data queue 322 is implemented, the data connection request from LAN Interface 330 is connected to the selected WAN Interface 310 via Data Connection 321 and data connection 311 of the selected WAN Interface 310 by Data Controller 326 via control bus 328, and is transmitted to the selected WAN. The Data Controller 326 then processes the next data connection request from LAN Interface 330. When any responsive data is received by the WAN Interface 310, Data Controller 326 stops processing data connection requests from LAN Interface 330 and connects the WAN Interface 310 that has received the data to the LAN Interface 330 and to the connected devices through wired connection 350 or wireless connection 340, or both. Data Controller 326 then returns to processing Internet connection requests from LAN Interface 330.

Figure 7:
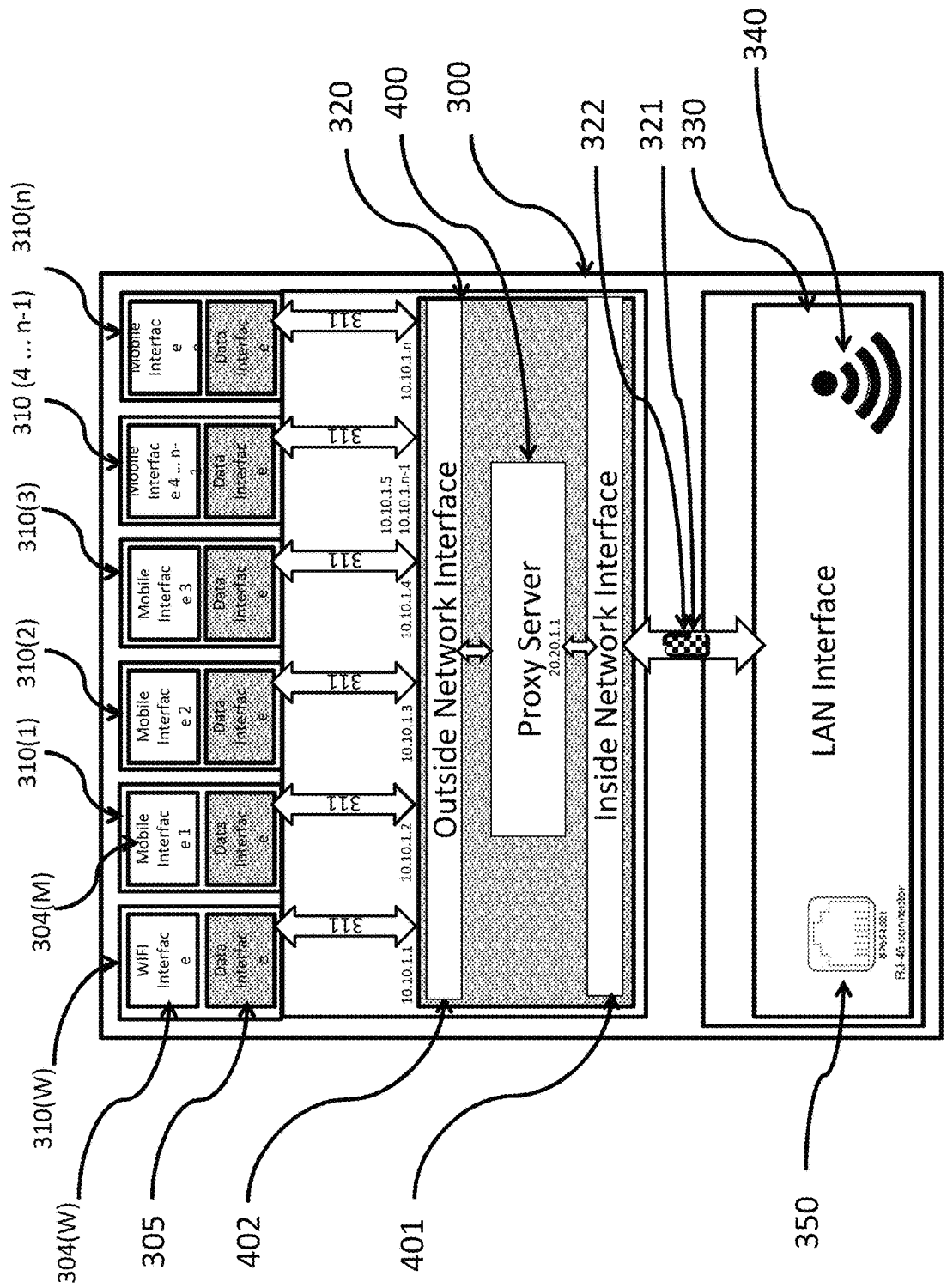
FIG. 7 illustrates schematically some of the data handling components and data connections, including a proxy server used as a WAN aggregation component, of an embodiment of a multi-WAN accelerated hotspot.

FIG. 7 Further illustrates schematically an alternative embodiment of the Multi-WAN hotspot 300 of FIGS. 3 and 4 where the Multi-WAN Aggregator 320 may comprise a multiport proxy server 400. A proxy server is a combination of software and hardware that connects to a server or network service via an outside port, and that also provides a connection point for other processes, such as network clients to connect to, instead of connecting directly to the server or network service, via an inside port. Such a conventional proxy server transfers network packets between the inside port and the outside port and provides the capability of performing additional processing on the packets, for example, for filtering, monitoring, or scanning the data for harmful or forbidden content transparently to the processes connected to the outside and inside ports. This type of proxy server may be used, for example, to scan for viruses, worms, or other malicious content in data in one or both directions, or to encrypt and decrypt the data traversing the Multi-WAN hotspot 320, for example by implementing a Virtual Private Network (VPN) services or similar technology that provides additional protection for the data communicated through the Multi-WAN hotspot.

The multiport proxy server 400 includes a Network Interface 301 that incorporates multiple outside ports that can each connect to a data interface 305 via its respective data connection 311. Each outside port is associated with a unique identifier, for example, an IP address or similar network identifier. The inside port of the multiport proxy server 400 further incorporates another Network Interface 401 that in this embodiment connects to a single LAN Interface 330 via data interface 321 that further incorporates data queue 322. The software components of Proxy Server 400 may be stored Memory 303 and execute on at least one Processor 301 shown in FIG. 4. Alternatively, Proxy Server 400 may be implemented in an embedded processor or similar architecture.

In operation, the multiport Proxy Server 400 connects to each Data Interface 305 and WAN Interface 304(W) or 304(M) that is active and connected to its respective network. The multiport Proxy Server 400 further connects to LAN Interface 330. Data connection requests or other data received by LAN Interface 330 are sent via data connection 321 to multiport Proxy Server 400, which in turn transmits the request to one of the available WANs connected to the outside ports of the multiport proxy server 400. The outside port may be selected using one of a number of possible algorithms implemented in the multiport proxy server 400, including without limitation: round robin, random, least-recently used, weighted by connection speed or throughput, or any other algorithm that may be implemented in the multiport Proxy Server 400. The multiport Proxy Server 400 may incorporate multiple algorithms that may be selected manually by the user, or automatically based on specific criteria, parameters, or conditions. For example, when the WAN connections have the same approximate data throughput, a round-robin algorithm or randomized algorithm may be automatically selected. By contrast, if one or more WAN(s) have significantly higher throughput than the others, a weighted algorithm may be selected to send more network traffic to WAN(s) with the higher data throughput. Similarly, if the different WAN have different maximum data limits or cost, the algorithm may shape the data flow to optimize throughput, speed, or cost, or balance the factors as specified by the user or according to pre-selected or programmed criteria.

The WAN selection algorithm of the multiport Proxy Server 400 may also operate dynamically by measuring parameters such as network speed, throughput, data cache utilization, ping delay, jitter, or other parameters during initialization, or at periodic intervals, and selecting or modifying a WAN selection algorithm based on the measured parameter(s).

When data is received from a WAN Interface 304(W) or 304(M), it is sent via data interface 305 and data connection 311 to outside Network Interface 402 of Proxy Server 400, which in turn sends the data via inside Network Interface 401 to LAN Interface 330 to the client connected to LAN Interface 330 that requested the data.

Because the various data connections could operate at different data rates and throughputs, data queue(s) may be incorporated into the data and network interfaces to regulate data throughput. One example of such a data queue is illustrated as data queue 322 incorporated into the data interface 321 that stores data connection requests sent via LAN Interface 330. Similar data queues may be incorporated, for example, into Data Interface 305, outside Network Interface 402, or inside Network Interface 401, or any other component as needed, and could queue data sent from LAN to WAN or from WAN to LAN, or both.

Figure 8:
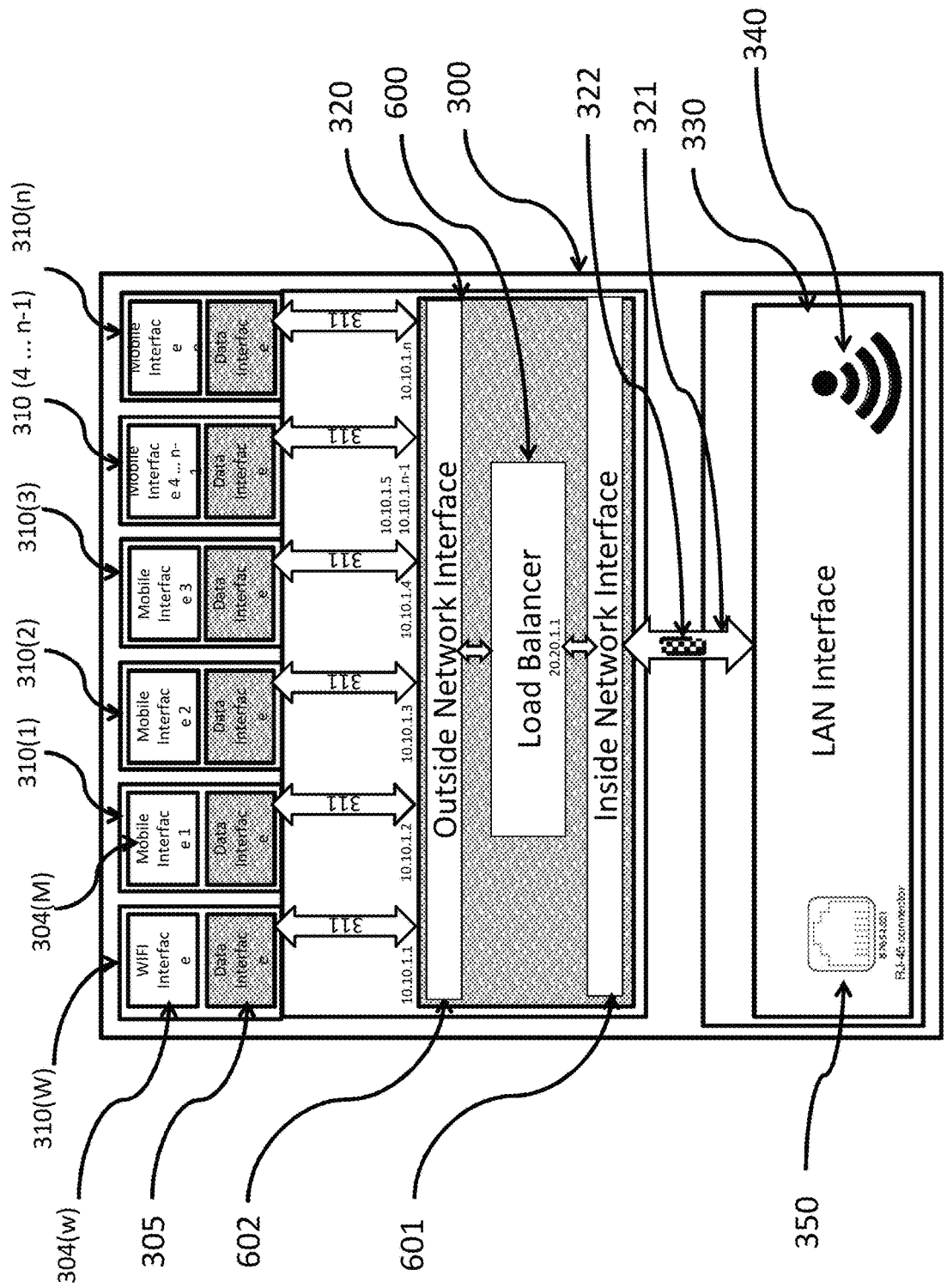
FIG. 8 illustrates schematically some of the data handling components and data connections, including a network load balancer used as a WAN aggregation component, of an embodiment of a multi-WAN accelerated hotspot.

FIG. 8 further illustrates schematically an alternative embodiment of the Multi-WAN hotspot 300 of FIGS. 3 and 4 where the Multi-WAN Aggregator 320 may comprise an improved network Load Balancer 600. A network load balancer is a system comprising software and hardware that distributes connection requests to a network resource, e.g., a data server, among multiple copies of that resource according to specific criteria (e.g., round-robin, random, first available, last used, etc.), in order to balance the load on each copy of the resource. In operation, each network client submits its request for access to a specific resource using a single network identifier (e.g., an IP address) and the network load balancer forwards the request to one copy among multiple copies of the same resource invisibly to the client. The specific copy of the resource that receives the forwarded request then completes the transaction by providing the requested data or service either directly to the client, or via the load balancer. The load balancer hides the existence of the multiple copies of the requested resource from the client by modifying the address information in the network packets sent by the client and/or the data packets sent to the client from the network resource copy. The main benefit of a load balancer is that it allows network resources to be scaled up invisibly to the clients by allowing the clients to use a single network identifier to access the resource through the load balancer. A conventional network load balancer, however, cannot improve the connection speed of the network connected to it, and it is limited to balancing the load among homogenous resources containing significantly similar data or providing significantly similar service.

In some embodiments, the Load Balancer 600 connects to each available WAN connected to its respective WAN interface 310(W) and/or 310(M) and forwards data connection requests or other data received from network clients through LAN Interface 330 to one of the available WANs. Unlike a conventional load balancer, because the WANs may have different speeds, throughputs, limits, or costs, the Load Balancer 600 incorporates algorithms that optimize the overall data transfer speed or throughput, cost, or data transfer limit, or a combination of these factors depending on the known or measured characteristics of each WAN. Such algorithms would not be required in a conventional network load balancer that typically operates in a controlled and homogenous environment.

The network Load Balancer 600 may incorporate multiple algorithms that may be selected manually by the user, or automatically based on specific criteria, parameters, or conditions. For example, if one or more WAN(s) have significantly higher throughput than the others, a weighted algorithm may be selected to send more network traffic to WAN(s) with the higher data throughput. Similarly, if the different WAN have different maximum data limits or cost, the algorithm may shape the data flow to optimize throughput, speed, or cost, or balance the factors as specified by the user or according to pre-selected or programmed criteria.

The WAN selection algorithm of the Load Balancer 600 may also operate dynamically by measuring parameters such as network speed, throughput, data cache utilization, ping delay, jitter, or other parameters during initialization, or at periodic intervals, and selecting or modifying a WAN selection algorithm based on the measured parameter(s).

When data is received from a WAN Interface 304(W) or 304(M), it is sent via data interface 305 and data connection 311 to outside Network Interface 602 of Load Balancer 600, which in turn sends the data via inside Network Interface 601 to LAN Interface 330 to the client connected to LAN Interface 330 that requested the data.

Because the various data connections could operate at different data rates and throughputs, data queue(s) may be incorporated into the data and network interfaces to regulate data throughput. One example of such a data queue is illustrated data queue 322 incorporated into the data interface 321 that stores data connection requests or other data sent via LAN Interface 330. A similar data queue may be incorporated, for example, into Data Interface 305, outside Network Interface 602, or inside Network Interface 601, or any other component as needed, and could queue data sent from LAN to WAN or from WAN to LAN, or both.

FIGS. 9A-9D provide a high-level flowchart of the operational steps of an example embodiment of the multi-WAN accelerated hotspot. As shown, at startup, the multi-WAN accelerated hotspot detects the number of active and valid Mobile WAN interfaces 501 and sets a counter n to that number in step 502. In the next step 503, the hotspot determines if there is an active Wi-Fi network present and initiates a connection to the Wi-Fi network, either by prompting the user to perform a login or by logging in using stored credentials in step 504. In steps 505-509, for each of the valid mobile network identified in steps 501 and 502, the hotspot connects to the network using appropriate credentials, such as a SIM or similar system, in step 509. At the end of the steps of FIG. 9D, the multi-WAN accelerated hotspot is connected to a Wi-Fi network, if one is available and accessible, as well as to all the WANs that are available, and that can be accessed by the credentials available to the hotspot. It may not be possible to connect to every single WAN for which credentials are available. If a WAN is off-line, or cannot be accessed for any reason, the hotspot skips that WAN network during startup and connects to the WANs that are available. The hotspot may survey the available WANs at regular intervals, upon request, or when other trigger conditions are satisfied, and may connect to any available WAN that had not been available, or disconnect from any WANs that have stopped working since the last survey.

Figure 9A:
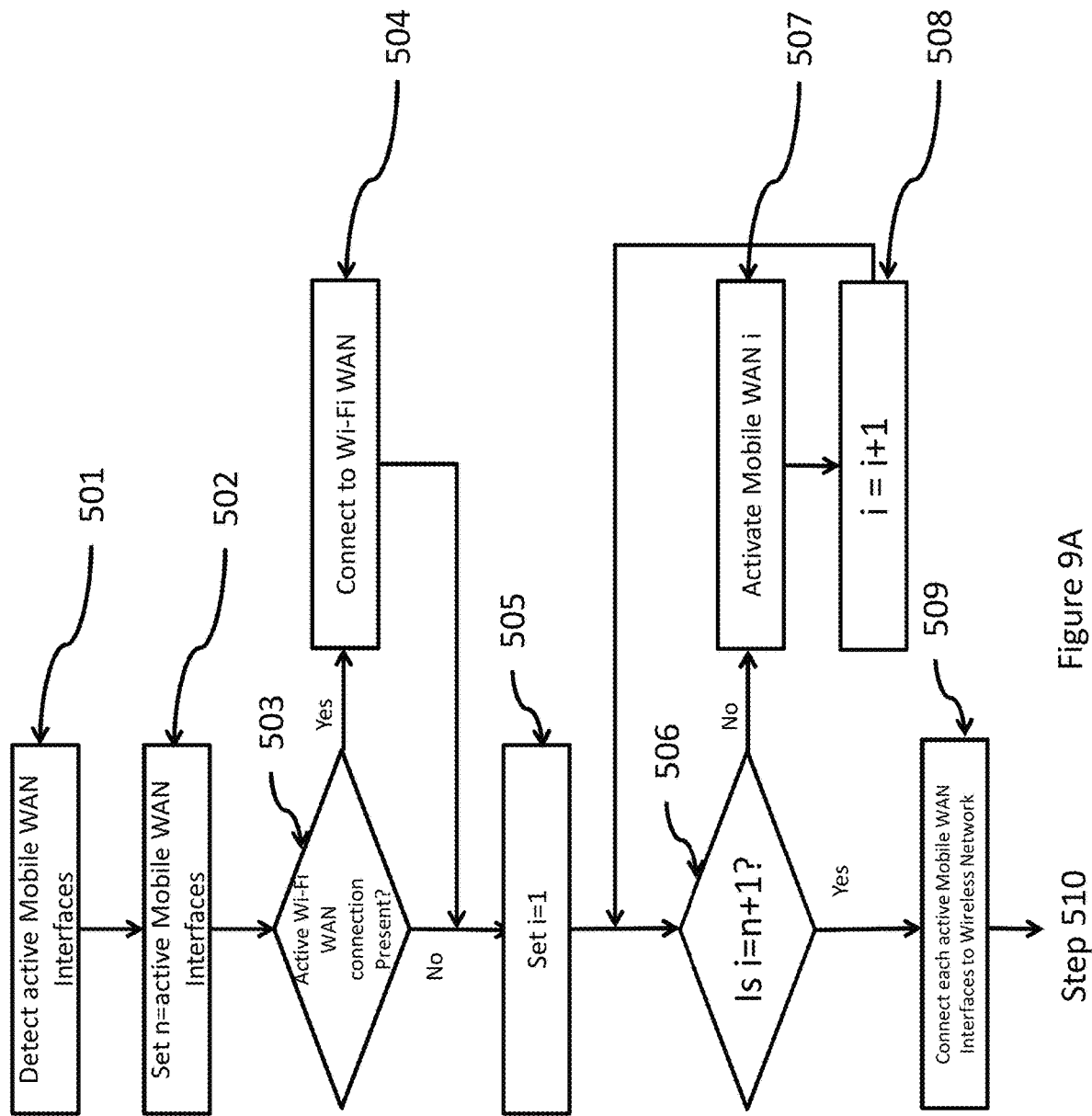
FIGS. 9A-9D illustrate the high-level operational steps of an embodiment of a multi-WAN accelerated hotspot.
Figure 9B:
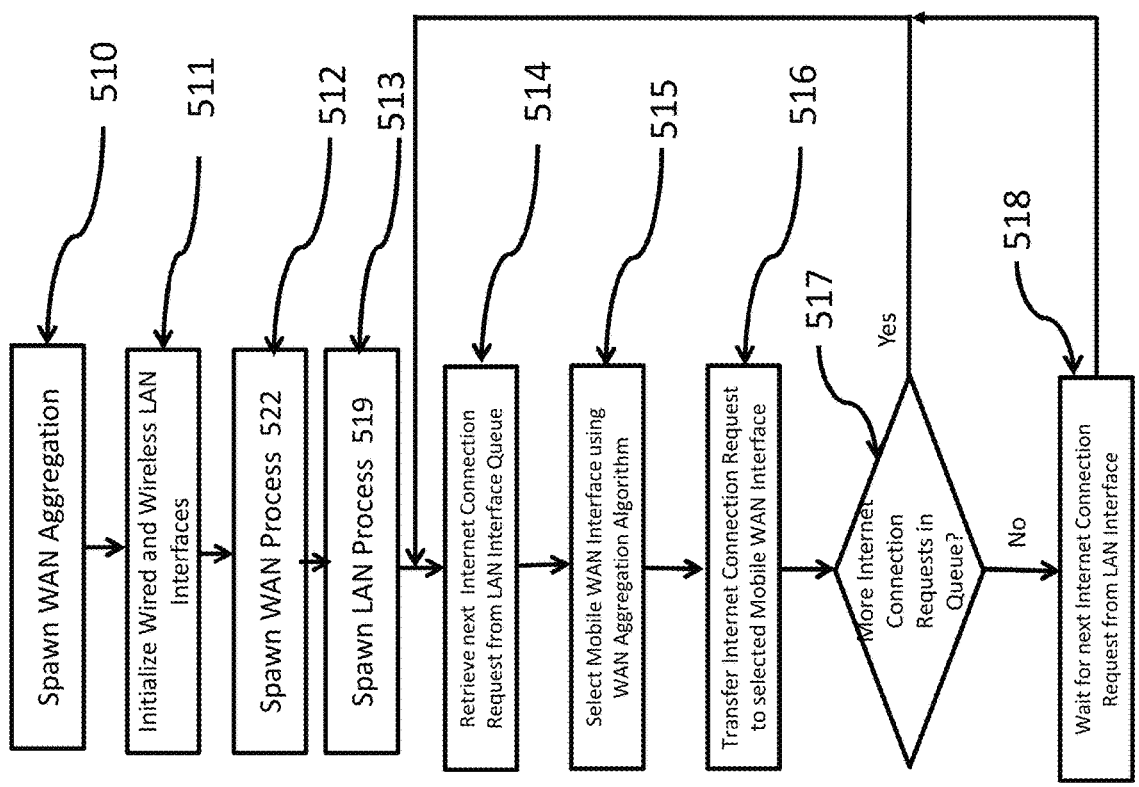
Figure 9C:
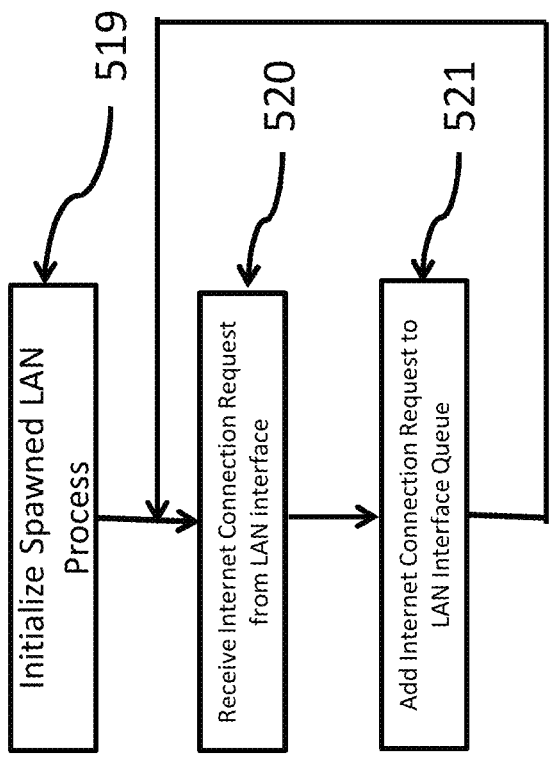
Figure 9D:
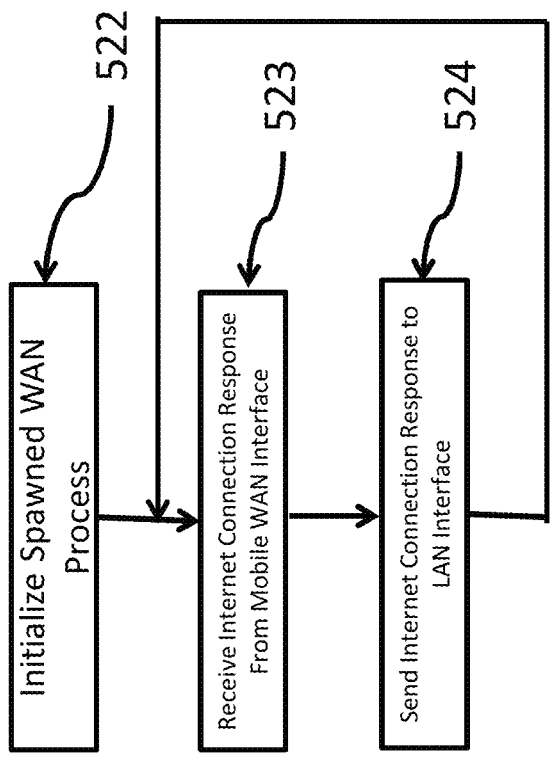

Continuing to FIG. 9B, in the next step 510, the WAN Aggregation system is initialized and spawned. As previously described in connection with embodiments illustrated herein, a variety of WAN aggregation algorithms may be implemented and selected during the operation of the accelerated Multi WAN hotspot. During startup, an aggregation algorithm may be selected either statically or dynamically. A static selection may be made by prompting the user or based on user or default settings. A static selection may also be made based on performance data measured from each WAN at startup. Dynamic selection may be made using any criteria at startup, and in addition, may periodically change the WAN aggregation algorithm based on periodic measurements or other input automatically, or by prompting the user to change settings.

In step 511, the local LAN connections, wired or wireless as implemented, are initialized to allow external devices to connect.

In step 512, the WAN Process (Steps 522-524) is spawned to process transfer of data to and from WANs to the WAN Aggregation system. In step 513, the LAN Process (Steps 519-521) is spawned to transfer data to and from the local LAN Interface and the WAN Aggregation system spawned in step 509. In this illustrative embodiment, the three processes spawned in steps 510, 512, and 513 run concurrently using conventional multitasking techniques and communication protocols.

Starting in step 519, the LAN process in initialized. In step 520, a connection or data request from one or more processes running on one or more devices connected to the LAN Interface 330 is received and placed in data queue 322 in step 521, and control is returned to step 519 to receive the next Internet connection or data request. If no data queue 322 is implemented, the connection request is sent directly to the WAN Aggregation process initiated in step 510. This process continues to loop between steps 520 and 521 during the operation of the system.

In step 522, the WAN process is initialized. In step 523 data requested by a process from an Internet server is received from one of the WANs either directly or through the WAN Aggregation process spawned in step 510. The received data is sent to the LAN Interface 330, either directly, or if implemented, through queue 322.

When all three processes are initialized and spawned, the operation continues to step 514 where the next Internet connection or data request is retrieved from data queue 322 (if implemented) or directly from LAN Interface 330. In Step 515, the active WAN Aggregation algorithm selects an active WAN Interface 310 (W) or 310(1) . . . 310(n) to receive the request, and in step 516, the Internet Connection Request is transmitted to the selected WAN Interface, which transmits it to the Internet via its respective WAN. In step 517, the process determines if there are more Internet connection requests waiting in data queue 322 (if implemented). If more requests are queued, the process continues to step 514. If no requests remain to be processed, in step 518, the process waits for the next request from LAN Interface 330 and when it arrives, places the request in data queue 322 (if implemented) and proceeds to step 514.

As described above in this exemplary embodiment, the spawned processes continually send Internet connection or data requests as they are made to the Multi WAN Aggregator 320, which in turn selects a WAN among the available WANs and transmits the request to the selected WAN. When any data is received from any of the active WANs in response to any of the Internet connection or data requests, the responsive data is transmitted to the LAN Interface and to the process that originally requested the connection.

Although various features and elements are described as embodiments in particular combinations, each feature or element can be used alone or in other various combinations within the principles of the present disclosure to the full extent indicated by the broad general meaning of the terms in which the appended claims are expressed.

The invention claimed is:

1. A portable multi-WAN hotspot, comprising:
   a portable housing;
   a portable power source disposed in or coupled to the portable housing and configured to provide power to the portable multi-WAN hotspot;
   a plurality of wide area network (WAN) interfaces configurable to couple to a plurality of wireless WANs, each WAN interface of the plurality of WAN interfaces configurable to establish a respective connection with a respective wireless WAN of the plurality of wireless WANs, at least two wireless WANs of the plurality of wireless WANs including at least two cellular WANs, at least two WAN interfaces of the plurality of WAN interfaces including at least two ports configured to receive at least two different subscriber information modules (SIMs), each SIM configured to assist in connecting over a respective cellular WAN of the at least two cellular WANs, each WAN interface of the plurality of WAN interfaces being disposed in or coupled to the portable housing;

a local area network (LAN) interface configured to establish a shared network connection with a plurality of network-enabled devices including a particular network-enabled device over a LAN, the LAN interface being disposed in or coupled to the portable housing; and a multi-WAN aggregator configured to:
configure a distribution protocol upon satisfaction of a trigger condition;
receive outgoing network data from the particular network-enabled device over the LAN;
dynamically assess attributes of the plurality of WAN interfaces;
use the distribution protocol to select based on the dynamically assessed attributes two or more WAN interfaces of the plurality of WAN interfaces for the outgoing network data;
partition the outgoing network data for transfer over the selected two or more WAN interfaces of the plurality of WAN interfaces;
transfer the partitioned outgoing network data to the selected two or more WAN interfaces of the plurality of WAN interfaces;
receive incoming network data from at least one of the selected two or more WAN interfaces of the plurality of WAN interfaces;
direct the incoming network data from the at least one of the selected two or more WAN interfaces of the plurality of WAN interfaces to the particular network-enabled device; and
transfer the directed incoming network data to the particular network-enabled device over the LAN.

2. The multi-WAN hotspot of claim 1, wherein at least one wireless WAN of the plurality of wireless WANs is a WiFi WAN and uses an IEEE 802.11 WiFi protocol.

3. The multi-WAN hotspot of claim 1, wherein the multi-WAN aggregator includes an n-to-1 multiplexer.

4. The multi-WAN hotspot of claim 1, wherein the multi-WAN aggregator includes a proxy server.

5. The multi-WAN hotspot of claim 1, wherein the multi-WAN aggregator includes a network load balancer.

6. The multi-WAN hotspot of claim 1, wherein the distribution protocol includes a round-robin protocol.

7. The multi-WAN hotspot of claim 1, wherein the distribution protocol includes a randomized WAN selection protocol.

8. The multi-WAN hotspot of claim 1, wherein the distribution protocol evaluates one or more characteristics of the plurality of WAN interfaces.

9. The multi-WAN hotspot of claim 1, wherein the distribution protocol evaluates one or more characteristics of each WAN interface.

10. The multi-WAN hotspot of claim 1, wherein the trigger condition is based on a startup process.

11. The multi-WAN hotspot of claim 1, wherein the trigger condition is based on passage of a time period.

12. The multi-WAN hotspot of claim 1, wherein the multi-WAN aggregator is further configured to:
encrypt the outgoing network data prior to transferring the partitioned outgoing network data to the selected two or more WAN interfaces of the plurality of WAN interfaces; and
decrypt the incoming network data prior to transferring the directed incoming network data to the network-enabled device over the LAN.

13. A method, comprising:
establishing an external network connection between each wide area network (WAN) interface of a plurality of WAN interfaces and each wireless WAN of a plurality of wireless WANs, at least two wireless WANs including at least two cellular WANs, at least two WAN interfaces of the plurality of WAN interfaces including at least two ports configured to receive at least two subscriber information modules (SIMs), each SIM configured to assist in connecting over a respective cellular WAN of the at least two cellular WANs, each WAN interface of the plurality of WAN interfaces being disposed in or coupled to a portable housing of a portable multi-WAN hotspot, the portable multi-WAN hotspot being powered by a portable power source disposed in or coupled to the portable housing;
establishing an internal network connection between a local area network (LAN) interface and a network-enabled device over a LAN, the LAN interface being disposed in or coupled to the portable housing;
configuring a distribution protocol upon satisfaction of a trigger condition;
receiving by a multi-WAN aggregator from the LAN interface outgoing network data from the network-enabled device, the multi-WAN aggregator being disposed in or coupled to the portable housing;
dynamically assessing attributes of the plurality of WAN interfaces;
using the distribution protocol to select based on the dynamically assessed attributes two or more WAN interfaces of the plurality of WAN interfaces for the outgoing network data;
partitioning by a multi-WAN aggregator the outgoing network data for transfer over the selected two or more WAN interfaces of the plurality of WAN interfaces;
transferring by a multi-WAN aggregator the partitioned outgoing network data to the selected two or more WAN interfaces of the plurality of WAN interfaces;
receiving by a multi-WAN aggregator incoming network data from at least one of the selected two or more WAN interfaces of the plurality of WAN interfaces;
directing by a multi-WAN aggregator the incoming network data from the at least one of the selected two or more WAN interfaces of the plurality of WAN interfaces to the network-enabled device; and
transferring by a multi-WAN aggregator the directed incoming network data to the network-enabled device over the LAN.

14. The method of claim 13, wherein at least one wireless WAN of the plurality of wireless WANs is a WiFi WAN and uses an IEEE 802.11 WiFi protocol.

15. The method of claim 13, wherein at least one wireless WAN of the plurality of wireless WANs uses a mobile telephony protocol.

16. The method of claim 13, wherein the multi-WAN aggregator includes an n-to-1 multiplexer.

17. The method of claim 13, wherein the multi-WAN aggregator includes a proxy server.

18. The method of claim 13, wherein the multi-WAN aggregator includes a network load balancer.

19. The method of claim 13, further comprising:
encrypting the outgoing network data prior to transferring the partitioned outgoing network data to the selected two or more WAN interfaces of the plurality of WAN interfaces; and
decrypting the incoming network data prior to transferring the directed incoming network data to the network-enabled device over the LAN.

* * * * *